United States Patent [19]

Rossmy et al.

[11] 4,087,448

[45] May 2, 1978

[54] PROCESS FOR PREPARING EQUILIBRATED ORGANOPOLYSILOXANE MIXTURES WITH ORGANOSULFONIC ACID GROUPS LINKED TO SILICON

[75] Inventors: Gerd Rossmy, Haltern-Lavesum; Rolf-Dieter Langenhagen, Hattingen-Niederwenigern, both of Germany

[73] Assignee: Th. Goldschmidt AG, Essen, Germany

[21] Appl. No.: 785,675

[22] Filed: Apr. 7, 1977

[30] Foreign Application Priority Data

Apr. 8, 1976 United Kingdom............14391/76

[51] Int. Cl.² .............................................. C07F 7/08
[52] U.S. Cl. ............................................. 260/448.2 E

[58] Field of Search ................................. 260/448.2 E

[56] References Cited

U.S. PATENT DOCUMENTS 3,948,963  4/1976  Rossmy ..................... 260/448.2 E X Primary Examiner—Paul F. Shaver
Attorney, Agent, or Firm—Toren, McGeady and Stanger

[57] ABSTRACT

A method is disclosed for preparing equilibrated organopolysiloxane mixtures having organosulfonic acid groups attached to silicon atoms by reacting organopolysiloxanes with organosulfonic acids and simultaneously removing the water formed from the reaction mixture. The compounds thus prepared are used for a variety of industrial purposes.

8 Claims, No Drawings

PROCESS FOR PREPARING EQUILIBRATED ORGANOPOLYSILOXANE MIXTURES WITH ORGANOSULFONIC ACID GROUPS LINKED TO SILICON

BACKGROUND OF THE INVENTION

1. Field of the Invention

The invention relates to a process for preparing equilibrated organopolysiloxane mixtures with organosulfonic acid groups linked to silicon by reacting organosiloxane compounds with organosulfonic acids or organodisulfonic acids.

2. Description of the Prior Art

Organopolysiloxanes with terminal reactive groups play an important industrial role. Such siloxanes, which were equilibrated by incorporating sulfate groups, are particularly important. As used herein, equilibration is understood to mean the equilibration of the polysiloxane mixture with regard to the molecular weight distribution and the distribution of possible different organosiloxane units within the molecule. At the same time, the sulfate groups can also take on the function of a terminal reactive group. An extensive patent literature deals with this subject and the German Pat. Nos. 2,059,546 and 2,059,554 are representative of this literature.

German Pat. No. 2,059,546 relates to a process for preparing predominantly linear, equilibrated organopolysiloxane mixtures with terminal sulfuric acid groups having the general formula

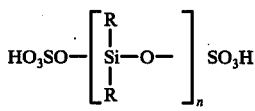   I wherein
$n = 2$ to 20, and R is a hydrocarbon residue which optionally may be substituted with a residue which is inert towards sulfuric acid and in which a part of the hydrocarbon residue R can be replaced by the

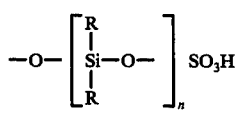

residue which is in equilibrium with sulfuric acid and cyclic compounds of the general formula

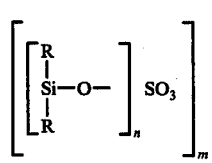   II wherein R has the same meaning as before and, in each case, two of the

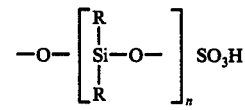

residues can be replaced by a

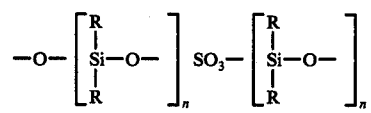

residue;
$m = 1$ to 10 and preferably is 1 or 2.

German Pat. No. 2,059,554 relates to a process for preparing equilibrated mixtures of polydiorganosiloxanyl sulfates of the general formula

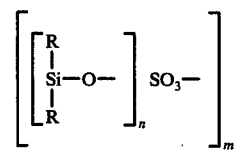

The substituents and indices in the above formulas have the following meaning:
$n = 2$ to 20 and preferably is 2 to 10,
$m = 1$ to 10 and preferably is 1 to 2,
R represents the same or different low molecular weight, optionally substituted alkyl residues with preferably 1 or 2 carbon atoms, which may be replaced partially by aromatic residues, preferably a phenyl residue, or by the residue

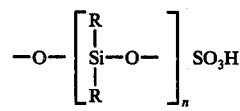

or in which, in each case, two R residues are replaced intermolecularly or intramolecularly by a residue having the structure

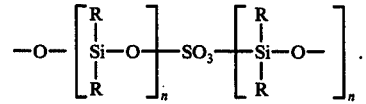

Organopolysiloxanes which also have terminal silyl halide, especially silyl chloride, groups, in addition to siloxanyl sulfate groups, are especially interesting. The preparation of such compounds is described, for example, in German Pat. No. 1,174,509 as well as in U.S. Pat. No. 3,115,512. The siloxanyl sulfate groups ensure a rapid development of the equilibrium state.

The above-mentioned compounds find much use as starting materials, for example, for the preparation of polysiloxanes with terminal hydroxyl groups or of polyalkylsilicic esters, of polysiloxanes with acyloxy groups, or they are used for modifying, for example, epoxide resins.

The reactions with high molecular weight hydroxyl compounds for the preparation of polysiloxane/polyoxyalkylene block compolymers, such as are described, for example, in the previously mentioned U.S. Pat. No. 3,115,512, have become particularly interesting. These reactions tend to be accompanied by side reactions which originate from the reaction of liberated sulfuric acid with organic hydroxyl compounds and result in the formation of sulfuric acid esters. Although these side reactions can be suppressed by the use of acid acceptors, there are some cases in which small amounts of by-products nevertheless separate out.

It is an object of German Pat. No. 2,331,677 to find reactive groups which can take over the role of the intramolecular or terminal sulfate groups which, in each case, are linked to one or more silicon atoms without having the disadvantages of these sulfate groups. These reactive groups must have a similar equilibrating effect as siloxanyl sulfate groups without, however, giving rise to interfering side reactions.

This object was accomplished by reacting organohalogen silanes or silane mixtures with an amount of water which was insufficient for splitting off all of the halide residues, and an organosulfonic acid in amounts of 0.005 to 1 equivalents/mole of silane.

This process has proven its value in practice. Nevertheless, it has some disadvantages. For example, organohalogen silanes are required as the raw material for carrying out the process. These silanes are corrosive and dangerously flammable substances. In addition, appreciable quantities of hydrogen halides are formed. Since these materials are acids, highly corrosion resistant installations must be used and considerable efforts must be made in order to remove them to avoid harmful effects on the environment. In addition, there exists the danger that the escaping hydrogen halide entrains silanes from the reaction, so that the control of the adjustment of the molecular weight of the reactive organopolysiloxane becomes more difficult.

SUMMARY OF THE INVENTION

The object of the present invention is to overcome the above difficulties and to provide a procedure by which equilibrated polyorganosiloxane mixtures in which organosulfonic acid groups are attached to silicon can be readily obtained with good reproducibility and using simple equipment.

This object is accomplished by reacting organopolysiloxanes with organo sulfonic acid, while splitting off and removing water. The inventive process obviously depends on splitting siloxane bonds with the organosulfonic acid as shown by the following reaction sequence

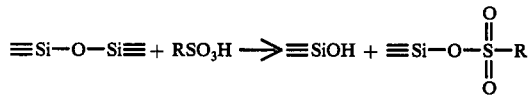

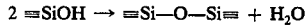

DESCRIPTION OF THE PREFERRED EMBODIMENT

By removing the water from the equilibrium mixture, an equilibrated siloxane is obtained which is almost completely free from SiOH groups and which is charcterized by terminally linked, reactive organosulfonic acid residues. The average molecular weight of the siloxanes is fixed simply by controlling the quantities of the reaction partners as is illustrated, by way of example, in the following reaction sequence

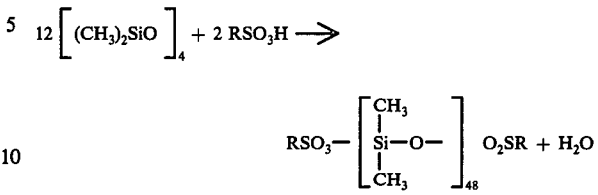

It was surprising that the equilibrated incorporation of organosulfonic acid residues as molecular weight limiting units succeeded in the absence of silyl halide groups. The organosulfonic acids are well known as strong acids and therefore, catalyze the polymerization and condensation of siloxane compounds to a great extent. Therefore, starting with polymerizable, e.g., cyclic polydimethylsiloxanes or condensable organopolysiloxanes, e.g., organopolysiloxanes with terminal SiOH groups, the interim occurrence of very high molecular weight species must be expected, which, as is well known, cannot readily be subjected to equilibrating reactions. In addition, the incorporation of organosulfonic acid into the siloxane system does not, in contrast to the incorporation of sulfuric acid, lead to any

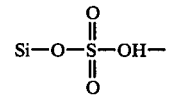

groupings. This, presumably is associated with the fact that the equilibrating capacity of the catalyst decreases with its incorporation into the polymer system. Surprisingly, however, these difficulties can readily be overcome in the inventive process. A particular version is preferred in which a minimum amount of water is maintained in the system over a certain period of time. Preferably, the removal of water from the system should take at least one half hour.

A further preferred version prescribes the use of 0.002 to 0.4 moles of organosulfonic acid per siloxane unit. Lesser amounts may also be used if allowances are made for longer reaction times. In these cases, however, it is preferable that 0.1 to 0.5 moles of water per sulfonic acid group be left in the system for a longer period of time (1 to 16 hours, especially 4 to 16 hours) and that the residual amount of water be removed only after this period. By means of these measures, it is possible to keep the exceedingly difficult balance between the equilibration reaction and the condensation or polymerization at such a level that reproducibly equilibrated siloxanes result within reasonable reaction times.

In principle, all liquid or soluble organopolysiloxanes can be used for the process of the present invention. The use of cyclic or linear polysiloxanes, especially of polysiloxanes containing diorganosilyl groups, is preferred. The linear polysiloxanes preferably contain SiOH end groups. However, other end groups are also permissible, even if they are not preferred. Such end groups are, for example, SiO-acyl, trialkylsiloxy or Si-alkoxy.

Especially preferred are oganopolysiloxanes which predominantly contain the methyl residue as the organic residue. However, the organic residue within the molecule can also, in part, be a different optionally substituted alkyl or aryl residue which is inert towards acid, for example:

—C$_2$H$_5$, n—C$_3$H$_7$—, —CH=CH$_2$, n—C$_8$H$_{17}$—, —(CH$_2$)$_2$—CN, —CH$_2$—Br, —(CH$_2$)$_3$Cl,

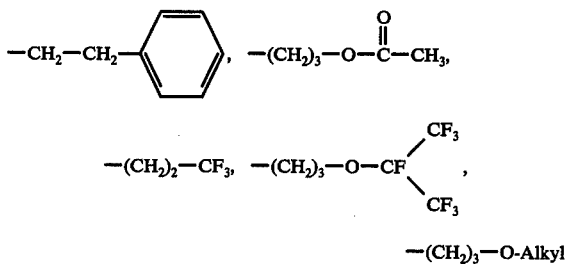

—(CH$_2$)$_3$—O-Alkyl

In addition, SiH groups may be contained within the organopolysiloxane.

Further data concerning organopolysiloxanes which may be equilibrated with acid catalysts and which carry substituents which are inert towards acids may be found in the book of W. Noll, "Chemie und Technologie der Silicone" (Chemistry and Technology of the Silicones), published by Chemie GmbH in 1968, as well as in the U.S. Pat. No. 3,115,512.

The hydrolysis products of dichlorodimethylsilane are, for example, particularly suitable as starting compounds. They represent a mixture of cyclic and linear siloxanes with OH end groups. They are, moreover, readily available substances which are prepared industrially on a large scale. Silicone oils, such as, for example, polydimethylsiloxanes with trimethylsilyl end groups can, in principle, also be used. In this case, however, the presence of additional, terminating, but unreactive end groups must be taken into consideration in the further processing of the inventive siloxanes. These non-reactive end groups can, however, be removed by distillation of, for example,

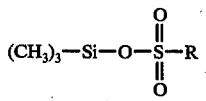

from the system. Branched, resin-like siloxanes require higher reaction temperatures. For these compounds, azeotropic distillation under pressure and at temperatures of up to 250° C is advantageous for the removal of water. In this case, it is also advisable to work with larger quantities of solvent.

As organosulfonic acids, compounds of the formula

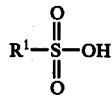

are used in which R$^1$ is an alkyl, aryl or alkaryl residue. Methyl, ethyl, propyl, isopropyl, buytyl and isobutyl residues are the especially preferred alkyl residues. The phenyl residue is the preferred aryl residue. Especially, p-tolyl and p-dodecylphenyl residues may be used as alkaryl residues. R may also be a halogenated, preferably perfluorinated, alkyl residue. Perfluoroalkyl sulfonic acids, with preferably 1 to 8 carbon atoms, are of particular interest if higher molecular weight organosiloxanes of the inventive kind are to be prepared, i.e., equilibrated organopolysiloxane mixtures with a molecular weight of 2,500 or higher and with organosulfonic acid groups attached to silicon.

The reaction temperature is preferably in the range of about 50° to 150° C and depends essentially on the manner in which the water is to be withdrawn from the reaction mixture.

In principle, all processes that lead to a physical separation of water are suitable for the removal of water. The preferred process is distillation, especially azeotropic distillation, with the aid of solvents known for this purpose, such as, for example, dichloromethane, benzene, toluene or xylene. The removal of water can be carried out at normal pressure and also under reduced or elevated pressure. The pressure is determined essentially by the vapor pressure of the respective solvent used at the desired reaction temperature. Toluene, benzene, and xylene are especially preferred.

Other compounds can, however, also be used in which R$^1$ represents a bivalent residue which has another SO$_3$H group. Examples of such disulfonic acids are, for example, naphthalene disulfonic acids and 4,4'-diphenyldisulfonic acid and $\alpha$, $\omega$-alkanedisulfonic acids. However, these are not preferred. In this case, the disulfonic acid links the polysiloxane blocks intermolecularly or intramolecularly.

The preferred compounds, prepared in accordance with the invention, are linear and can be described by the average formula I

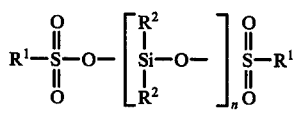

in which R$^1$ represents the above-described residues of the organosulfonic acids used. Preferably, R$^1$ is a methyl, ethyl, perfluoroalkyl group (with 1 to 8 carbon atoms in the alkyl residue), or the p-tolyl residue. R$^2$ is an organic residue inert towards acids. Preferably, it is the methyl residue.

It is obvious to those skilled in the art that the replacement of only a few CH$_3$ residues by other organic residues does not, as a practical matter, change the properties of the compound. n is any number greater than 1, preferably, 5 to 10,000, and especially 5 to 1,000.

The application possibilities of the compounds of the present invention have been discussed above. They correspond to the application possibilities of products prepared according to German Pat. No. 2,331,677, namely, for example, for the manufacture of polyorganosiloxanes with terminal hydroxyl, acyloxy or alkoxy groups. The compounds are starting compounds for the preparation of polysiloxane-polyether block copolymers, for example, according to the procedure of U.S. Pat. No. 3,115,512.

The organosulfonic acid salts that result from neutralizing the reaction involving organohydroxyl compounds, are free of hydrogen halide salts. This facilitates the recovery of the organosulfonic acid. With the inventive process, it is also possible to reproducibly prepare equilibrated organopolysiloxanes, modified with terminal SiOH groups and having higher molecular weights (molecular weights of 2,600 or higher). These polydimethylsiloxanes with terminal OH groups, obtained by hydrolysis, are suitable, inter alia, for the preparation of elastomers. In the preparation of these polydimethylsiloxanes, hydrolysis of the inventive compounds by neutralizing with solid Ca(OH)$_2$ has proven itself to be useful.

The state of equilibration can be determined by converting the inventively prepared siloxanes to the corresponding alkoxy siloxanes and, insofar as they are low molecular weight products, analyzing their composition quantitatively with the help of gas chromatography. Higher molecular weight siloxanes can be characterized by means of liquid chromatography or gelpermeation chromatography. Indirect proof can be obtained by virtue of the fact that important properties of the siloxanes are independent of the choice of low or high molecular weight organopolysiloxanes as the starting materials, whereby the properties considered are viscosity, the content of cyclic siloxanes and the properties of compounds which are prepared from these siloxanes, such as, for example, the foam-stabilizing properties in polyurethane foaming, of polyether-polysiloxane copolymers prepared from these compounds.

The inventive process is explained in greater detail by means of the following examples.

EXAMPLE 1

1066 g of a methyl polysiloxane, obtained by the complete hydrolysis of methyldichlorosilane and having 1.2% by weight of hydroxyl groups, are mixed with 190 ml toluene and 181 g of p-toluenesulfonic acid monohydrate and heated to 110° C. The toluene and water are azeotropically distilled off at a pressure of 340 to 440 torr. The toluene is returned to the reaction vessel. After 34 g of water have been removed over a period of 2 hours, the reaction product is freed from toluene. It has an acid content of 0.778 × 10$^{-3}$ equivalents of acid per gram. Theoretically, a product having the formula

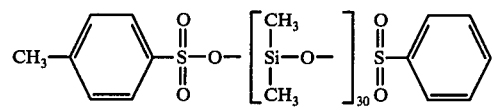

with an acid number of 0.784 × 10$^{-3}$ equivalents of acid per gram would have been expected.

The reaction product was reacted with i-propanol, using triethylamine as the acid acceptor. 9.9% by weight of cyclic dimethylsiloxanes of the following distribution could be detected in the gas chromatogram of that portion which was vaporized at a bath temperature of 300° C and a pressure of 0.2 torr:

| Weight % | Number of $\begin{bmatrix} CH_3 \\ | \\ Si-O- \\ | \\ CH_3 \end{bmatrix}$ Units in Ring |
|---|---|
| 0.1 | 3 |
| 5.0 | 4 |
| 3.3 | 5 |
| 1.1 | 6 |
| 0.3 | 7 |
| 0.1 | 8 |

The evaluation was made on the basis of assuming the same factor for all siloxanes determined.

Repeating the reaction using equilvalent amounts of methanesulfonic acid and octamethylcyclotetrasiloxane leads to a siloxane that, on reaction with i-propanol, shows the same results although the starting siloxanes are different. By these means, proof is obtained that a thorough equilibration has been attained. This can also be proven indirectly by the fact that both reaction products, after reacting with a polyether having a molecular weight of 3050, form block copolymers which show the same effectiveness in polyurethane foaming. The polyether was obtained by the addition of propylene oxide and ethylene oxide to butylglycol, the two alkylene oxides being added as a mixture and 1.5 moles of pure propylene oxide per mole of butyl glycol being added only at the conclusion and the total propylene oxide content amounting to 58% by weight.

The two inventively obtained siloxanes incorporate further additions of octamethylcyclotetrasiloxane equilibrating into the molecule while enlarging the molecule, whereby the cyclic siloxane does not alter noticeably. The equilibration takes place by the addition of 0.3 moles of water per mole of product having the formula

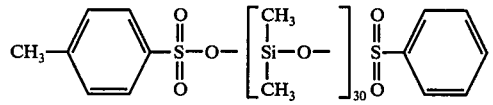

at 100° C, whereby, after 10 hours, the total quantity of water is again azeotropically removed during a further 4 hours.

EXAMPLE 2

742 g of octamethylcyclotetrasiloxane are mixed with 19 g of p-toluenesulfonic acid monohydrate and 130 ml of toluene and, while stirring, heated to a temperature of 150° C to 160° C. Water and toluene are distilled off azeotropically. The water is separated in a separator and the toluene is returned to a reaction vessel. The reaction time is two hours. 2.8 g of water are produced (the theoretical amount is 2.7 g). Toluene is removed from the reaction product which has an acid number of 0.134 × 10$^{-3}$ equilvalents of acid per gram. Theoretically, a prorduct of Formula I with R$^1$ = CH$_3$C$_6$H$_4$, R$^2$ = CH$_3$ and $n$ = 200, and a theoretical acid content of 0.132 × 10$^{-3}$ equilvalents of acid per gram would have been expected.

EXAMPLE 3

1120 g of a polydimethylsiloxane, obtained by the total hydrolysis of dichlorodimethylsilane, consisting mainly of linear compounds and having a hydroxyl content of 1.2% by weight, are mixed with 150 g of toluene and 15 g of perfluorobutanesulfonic acid and heated to 110° C. Toluene and water are azeotropically distilled off at a pressure of 340 to 430 torr. The water is separated in a separator and the toluene is returned to the reaction vessel. The reaction time is 3 hours, 7.5 g of water (the theoretical amount is 7.6 g) being separated after half of this time. In addition, 52 g of toluene are collected in the separator. Because of the residual toluene, the siloxane content of the product is 92%. This product has an acid content of 0.413 × 10$^{-4}$ equivalents of acid per gram from which, according to Formula I with R$^1$ = C$_4$F$_9$— and R$^2$ = CH$_3$—, $n$ is calculated to be 593 (theoretically $n$ = 600).

EXAMPLE 4

520 g of a polydimethylsiloxane which is obtained by complete hydrolysis of dichlorodimethylsilane and which consists to the extent of ca. 50% of cyclic siloxanes (mainly octamethylcyclotetrasiloxane) and to the extent of ca. 50% of linear, OH terminated siloxane and which has a hydroxyl group content of 0.4% by weight, are reacted with 7.6 g of p-toluenesulfonic acid monohydrate in the presence of 100 ml toluene, as described in Example 2, to form a compound of Formula I. 2.2 g of water (the theoretical amount is 2.2 g) are distilled off. The toluene-free product has an acid content of $0.765 \times 10^{-4}$ equivalents of acid per gram. The product obtained corresponds to a compound of Formula I, in which $R^1 = CH_3C_6H_4-$, $R^2 = CH_3-$ and $n = 348$.

EXAMPLE 5

In a flask equipped with a stirrer and facilities for azeotropic distillation, 556.2 g of a octamethylcyclotetrasiloxane and 343.1 g of a polysiloxane, obtained by the total hydrolysis of γ-chloropropylmethyldichlorosilane and having an OH content of 0.8% by weight, are heated with 19.2 g of methanesulfonic acid and 140 ml toluene to 150° C to 160° C. At the same time, water and toluene are distilled off azeotropically. The water is separated off and the toluene is returned to the reaction vessel. When 1.4 g of water have been distilled off, the equipment is switched over to total reflux. Initially, 1.8 g of water remain in the reaction mixture. This is equivalent to 0.5 moles of water per mole of methanesulfonic acid used. The reaction is continued for 5 hours under reflux. The remaining 1.8 g of water are then distilled off during 1 hour. Subsequently, the toluene is also distilled off. A homogeneous siloxane is obtained. The two starting siloxanes are not miscible with one another. The siloxane obtained has an acid content of $0.219 \times 10^{-3}$ equivalents of acid per gram and corresponds to a compound of Formula I, in which $R^1 = CH_3-$, $R^2 = CH_3$ and $Cl(CH_2)_3-$, the ratio of

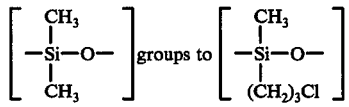

and $n = 100$.

EXAMPLE 6

744 g of a polydimethylsiloxane, obtained by the complete hydrolysis of dichlorodimethylsilane and containing 0.6% by weight of hydroxyl groups, are mixed with 0.6 g of perfluorobutanesulfonic acid and 370 g of toluene and heated with stirring to the reflux temperature. The mixture is allowed to react for 5 hours at the reflux temperature. Water and toluene are then distilled off. The water is seperated in a separator and the toluene is returned to the reaction vessel. The distillation time is 2 hours. 2.4 g of water are obtained (the theoretical amount is 2.4 g). In addition, 50 g of toluene are collected in the separator. The product is diluted by the remaining toluene to a siloxane content of 70%. The acid content of this toluene-containing product is $1.9 \times 10^{-6}$ equivalents of acid per gram. The expected product of Formula I with $R^1 = C_4F_9-$, $R^2 = CH_3-$ and $n = 10,000$, also as a 70% solution in toluene, has a theoretical acid content of $1.887 \times 10^{-6}$ equivalents per gram. The product obtained was highly viscous, but still flowable.

What is claimed is:

1. A process for the preparation of equilibrated organopolysiloxane mixtures with organosulfonic acid groups attached to silicon atoms comprising reacting organopolysiloxanes with organosulfonic acids with the simultaneous removal of water from the reaction mixture.

2. The process of claim 1 wherein the water is removed by azeotropic distillation.

3. The process of claim 2 wherein the distillation is carried out at elevated pressure.

4. The process of claim 1 wherein 0.002 to 0.4 moles of organosulfonic acid are used per Si-atom containing structural unit.

5. The process of claim 1 wherein from about 0.1 to 0.5 moles of water per sulfonic acid groups are allowed to remain in the reaction mixture during a first reaction period of about 1 to 16 hours, and thereafter, removing this water from the reaction mixture.

6. The process of claim 1 wherein said first reaction period is from about 4 to 10 hours.

7. The process of claim 1 wherein compounds having the formula

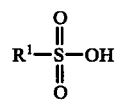

wherein $R^1$ is an alkyl, aryl or alkaryl residue, are used as the sulfonic acids.

8. The process of claim 7 wherein $R^1$ is a low molecular weight alkyl residue with 1 to 4 carbon atoms, a phenyl residue, a p-tolyl or a p-dodecyl residue.

* * * * *